US012625535B2

(12) United States Patent
Prein et al.

(10) Patent No.: US 12,625,535 B2
(45) Date of Patent: May 12, 2026

(54) ETHERNET SWITCH WITH INTEGRATED POWER SUPPLY UNIT

(71) Applicant: Murrelektronik GmbH, Oppenweiler (DE)

(72) Inventors: Olaf Prein, Luegde-Rischenau (DE); Markus Rentschler, Dettingen (DE); Ingo Wolff, Oehringen (DE)

(73) Assignee: Murrelektronik GmbH, Oppenweiler (DE)

( * ) Notice: Subject to any disclaimer, the term of this patent is extended or adjusted under 35 U.S.C. 154(b) by 48 days.

(21) Appl. No.: 18/622,268

(22) Filed: Mar. 29, 2024

(65) Prior Publication Data

US 2024/0338064 A1 Oct. 10, 2024

(30) Foreign Application Priority Data

Apr. 6, 2023 (EP) ..................................... 23167161

(51) Int. Cl.
*G06F 1/26* (2006.01)
*H04L 12/10* (2006.01)

(52) U.S. Cl.
CPC .............. *G06F 1/266* (2013.01); *H04L 12/10* (2013.01)

(58) Field of Classification Search
CPC .................................. G06F 1/266; H04L 12/10
See application file for complete search history.

(56) References Cited

U.S. PATENT DOCUMENTS

| | | | |
|---|---|---|---|
| 2009/0228722 A1* | 9/2009 | Lin | H04L 12/10 |
| | | | 713/300 |
| 2011/0131455 A1 | 6/2011 | Law et al. | |
| 2011/0298428 A1* | 12/2011 | Liu | G06F 1/266 |
| | | | 320/162 |
| 2022/0337450 A1 | 10/2022 | Walther | |

FOREIGN PATENT DOCUMENTS

| | | |
|---|---|---|
| DE | 20 2009 013 171 U1 | 12/2009 |
| DE | 10 2010 037 262 A1 | 4/2011 |
| DE | 10 2019 126 341 A1 | 4/2021 |
| EP | 2 202 914 A1 | 6/2010 |

* cited by examiner

Primary Examiner — Jaweed A Abbaszadeh
(74) Attorney, Agent, or Firm — Walter Ottesen, P.A.

(57) ABSTRACT

An ethernet switch includes a housing that has at least one communication input for data of a controller, at least one system input for a system voltage and at least one communication output. At least one voltage output to an electrical load is also provided. A power supply unit, which provides the voltage supply for the switch, is provided in the housing of the switch. The power supply unit also feeds the at least one voltage output to an external load. A field bus element, which is preferably configured to monitor and/or to control the voltage output to an external load, is integrated in the housing of the switch.

16 Claims, 2 Drawing Sheets

ETHERNET SWITCH WITH INTEGRATED POWER SUPPLY UNIT

CROSS-REFERENCE TO RELATED APPLICATIONS

This application claims priority of European patent application no. 23167161.1, filed Apr. 6, 2023, the entire content of which is incorporated herein by reference.

TECHNICAL FIELD

The disclosure relates to an Ethernet switch including a housing that has at least one communication input for data of a controller and at least one communication output for actuating at least one module. A system input for a system voltage and at least one electrical supply output to an electrical load are also provided.

BACKGROUND

It is a known practice to also provide the power supply for connected electrical loads such as communication devices, sensors and/or actuators by way of network cabling. In a simple embodiment, this is known under the term PoE (Power over Ethernet), in the case of which individual lines of an Ethernet cable that are not used for data transmission are used to supply power. In the case of a single-pair Ethernet, what is known as PoDL (Power over Data Line) technology is used, in the case of which the data to be transmitted are overlaid on the voltage-carrying line by modulation.

In production installations, conveyor installations or similar installations of greater physical extent, data lines and/or lines for supplying power are often laid in parallel, in particular if electrical loads (sensors and/or actuators) present in the system are to be operated with different voltages.

SUMMARY

It is an object of the disclosure to specify an Ethernet switch, which is of simple configuration and is able to be used in a versatile manner, for use in industrial installations of greater physical extent, via which different electrical loads can be supplied with energy and actuated.

The object is, for example, achieved by virtue of a power supply unit being provided in the housing of the switch itself, which power supply unit provides the voltage supply for the switch itself, on the one hand, and feeds an external load via the at least one electrical supply output, on the other hand. In particular, a field bus element is integrated in the housing of the switch. The field bus element advantageously operates with Profinet (Process Field Network) protocols, an Ethernet/IP (EtherNet Industrial Protocol, also often called EIP), an OPC/UA (Open Platform Communication/Unified Architecture) and/or an EtherCAT (Ethernet Control Automation Technology). The field bus element is configured to monitor and/or to control the electrical supply output. This makes it possible to electrically monitor a connected external load by way of the field bus element in the housing of the switch. The monitoring makes it possible to identify malfunctions in good time and to report them, for example, to a central controller, by way of the field bus. Furthermore, controlling the electrical supply output makes it possible to vary the voltage level supplied to an external load, the supplied current and/or the supplied power. In particular, the power is limited for a PoE output or management for the power is provided at a PoE output. The maximum current is restricted for an IO-Link output.

In particular, there is the possibility of providing a supply voltage that is adapted to the load depending on the characteristic data of the connected external load.

A system voltage only has to be supplied to the switch via just one connection, with which the power supply unit in the switch can be operated. A respective supply output can advantageously be integrated in an outgoing line of the switch, with the result that a load that is to be connected not only can be controlled via a communication link, but at the same time is connected to a supply voltage. The supply voltage advantageously can be variable, in particular can be adapted to characteristic data of the load. Therefore, the level of the supply voltage can be adjusted, the maximum current can be adjusted or the output electrical power can be adjusted. The electrical values can also be adjusted according to an average value by switching the voltage and/or the current on and off.

In one embodiment of the disclosure, the switch is in the form of a subscriber of a field bus. Any number of switches can be connected via the field bus. The system voltage necessary for operating the power supply unit is looped through to the respective switches in the field. Alternatively or additionally, provision can be made for one or more T-pieces to be provided in the power cable supplying the system voltage, via which T-pieces one or more further switches can be connected.

In an embodiment of the disclosure, provision is made for the field bus element to be configured to configure the switch itself. The switch is therefore adapted to its place of use and the work to be carried out in a simple manner.

In a particular configuration of the disclosure, the field bus element is provided in the housing of the switch and in particular forms a gateway to other protocols in the field of the installation. In this way, comprehensive communication between different protocols is possible.

Advantageously, the supply output of the switch is integrated at least into a PoE (Power over Ethernet) output. Such a PoE output is in particular of pluggable configuration. Expediently, the PoE output is configured with a protection rating of IP54 or higher.

Alternatively or additionally, the supply output can also be integrated into an SPE (Single Pair Ethernet) output. Such an output therefore forms a PoDL (Power over Data Line) output. Preferably, the SPE output integrated with the supply output is of pluggable configuration. A protection rating of the plug connection of IP54 or higher is expedient.

Alternatively or additionally, the supply output can be also integrated at least into an IO-Link output. The IO-Link output is preferably of pluggable configuration. Expediently, the IO-Link output is configured with a protection rating of IP54 or higher.

In an embodiment of the disclosure, provision is made for the supply output to carry an output voltage of the power supply unit. This output voltage of the power supply unit can be a fixed output voltage or a variable output voltage. The power supply unit can also provide more than one output voltage that can be tapped off at a respective one or more voltage outputs. By way of example, the power supply unit can provide output voltages of 12 V, 24 V or 48 V.

The voltage input for the system voltage of the power supply unit arranged in the housing of the switch is advantageously looped through to a system output, that is provided in the housing, for the system voltage. Multiple switches can therefore preferably be connected to the same system voltage in a row one behind the other in a simple manner.

The communication input for data of a controller is advantageously looped through to a communication output that is provided in the housing. The data transmitted on a data line of a field bus can be provided to a plurality of switches at the same time via the field bus.

In order to reduce cabling complexity, it can be advantageous for the system input of the switch for the system voltage and the communication input of the switch to be combined to form a common power line. It is therefore possible to reduce the number of connections of the switch.

A power line is understood to mean a common cable for the system voltage and the data line. This can be in the form of a hybrid line that includes separate lines for the data and the supply voltage. The power line advantageously has common lines for the data traffic and the system voltage. Data to be transmitted are expediently modulated onto the system voltage.

The system voltage can be in a range of from 90 V to 800 V AC/DC. It is advantageously in a range between 100 V and 400 V AC or 600 V and 800 V DC, in particular 650 V AC. The system voltage is converted, via the power supply unit, for example to a supply voltage of 12 V, 24 V or 48 V for connected electrical loads such as sensors or actuators. Supply voltages of from 36 V to 57 V, expediently 42.5 V to 57 V, are also advantageous. In particular, the PoE output can have the voltage range of from 36 V to 57 V.

In order to enable a robust use of the switch in the field, provision is made for the switch to have a protection class of IP54 and higher.

BRIEF DESCRIPTION OF DRAWINGS

The invention will now be described with reference to the drawings wherein.

DETAILED DESCRIPTION

Figure 1:
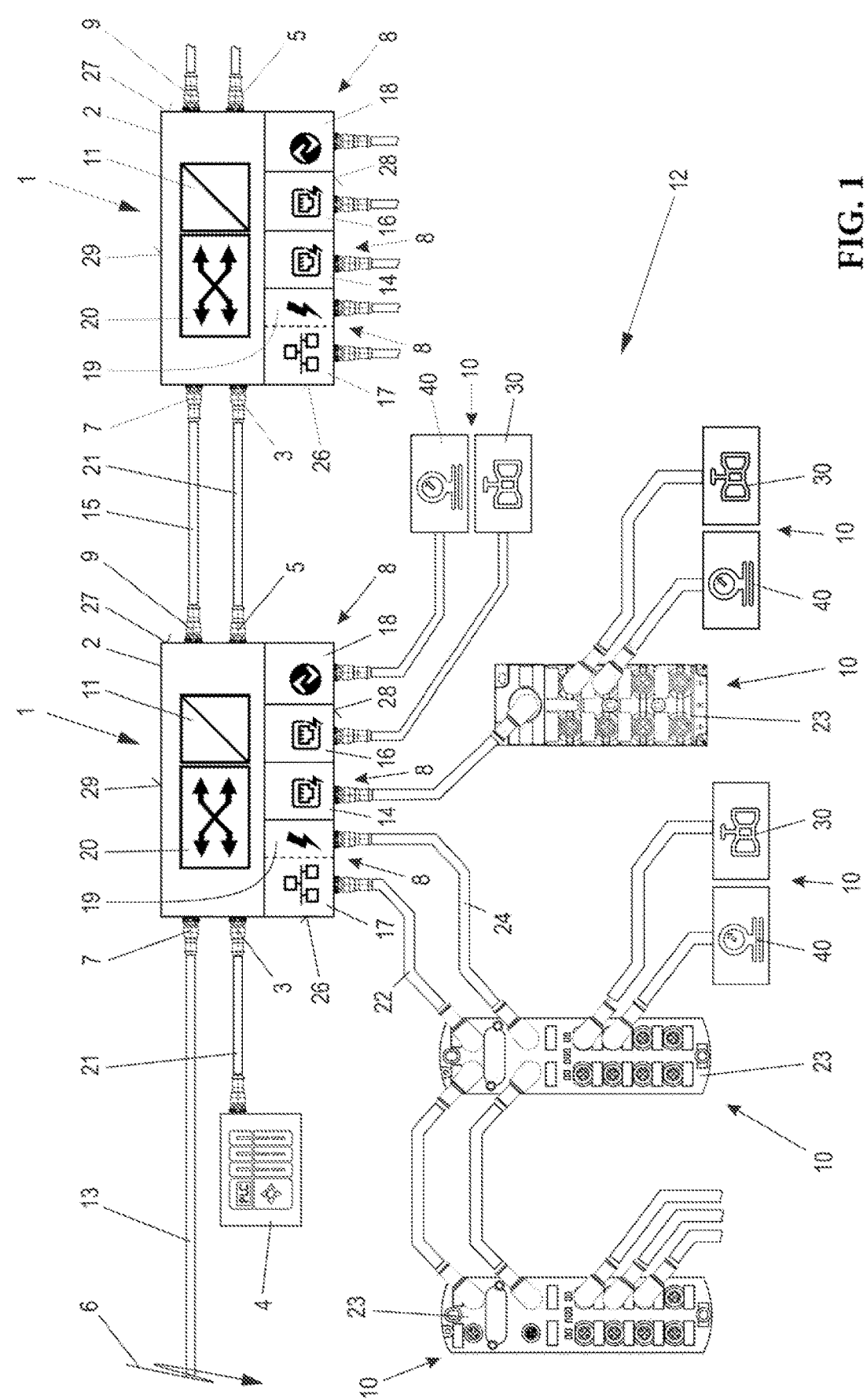
FIG. 1 is a schematic representation of a switch according to the disclosure in the field of an industrial installation; and, FIG. 2 is a schematic representation of a switch according to the disclosure in the field of an industrial installation with a power line consisting of a power connection and data line.

In FIG. 1, the switch according to the disclosure is designated by the reference sign 1. The switch 1 has a housing 2 that has a high protection class. The switch 1 has a protection class of IP54 or higher. The switch 1 can be part of a controller of a physically extensive installation 12, for example, of a production installation, a conveyor installation or similar installation.

The switch 1 has a system input 7 for a system voltage 6 that is supplied via a power cable 13. The system voltage can be 90 V to 800 V. In particular, the system voltage is 100 V to 400 V AC, in particular 110 V AC, preferably 230 V AC to 400 V AC or 600 V to 800 V DC, in particular 650 V DC. The system input 7 for the system voltage 6 is looped through to a system output 9 for the system voltage 6. A further switch 1 can be connected to the system output 9 via a further power cable 15.

The switch 1 also has a communication input 3 for the data of a controller 4 and a communication output 5, via which the data of the controller 4 can be forwarded to a further switch 1, which in particular is connected downstream in series. The controller can be a PLC (Programmable Logic Controller), a PC, or the like.

A power supply unit 11 is arranged in the housing 2 of the switch 1. The power supply unit 11 is connected on its primary side to the system voltage 6. At least one output voltage is available on the secondary side of the power supply unit 11. The output voltage can be, for example, 12 V, 24 V, 48 V, or a similar voltage. In particular, the power supply unit can provide multiple parallel output voltages. In one particular configuration, the output voltage and/or the output current are adjustable.

The power supply unit 11 is used to supply electrical power to connected loads 10. For this purpose, the output voltage of the power supply unit 11 is supplied to an electrical load 10 via a supply output 8.

The power supply unit 11 provided in the housing 2 of the switch 1 is configured to also provide the voltage supply for the switch 1 itself. In addition to supplying voltage to at least one supply output 8 to an external load 10, the power supply unit is at the same time used to supply energy to the switch 1 itself.

It should be emphasized that a field bus element 20, which is configured to monitor and/or to control a supply output 8 to an external load 10, is integrated in the housing 2. The field bus element 20 is configured to monitor the current consumption of a connected electrical load 10, such that, for example, if a current limit value is exceeded, the field bus element 20 can output a report by way of the field bus 21. Furthermore, the field bus element 20 is configured to vary the voltage and/or the current of a supply output 8. Therefore, in the case of an actuator 30, for example, a temporary high starting current can be initiated in order to ensure a rapid response of the actuator 30. An excessively high current consumption of a sensor 40 can be an indication of an impending failure, which is identified by way of the field bus element 20 and is reported for example, to a central controller in the field bus 21. In this case, the switch 1 is advantageously in the form of a subscriber of the field bus 21.

In a particular configuration of the disclosure, the field bus element 20 is configured to configure the switch 1 for operation on the field bus 21. When the system voltage 6 is switched on, the switch 1 will begin and carry out a self-configuration in order to then commence operation without intervention by a user.

In order to ensure the widest possible use of the switch 1 according to the disclosure, provision is made for the field bus element 20 to be configured in such a way that it forms a gateway to other protocols in the field of the installation 12. The switch 1 can process different protocols.

As shown in FIG. 1, the supply output 8 can be integrated at least into a PoE (Power over Ethernet) output 14. The PoE output is preferably of pluggable configuration. In particular, the PoE output is configured with a protection rating of IP54 or higher.

Alternatively or additionally, the supply output 8 can also be integrated into an SPE (Single Pair Ethernet) output 16. The SPE output is preferably pluggable. In particular, the SPE output is configured with a protection rating of IP54 or higher.

It can be expedient to integrate the supply output at least into an IO-Link (IO=point-to-point communication) output 18. Strictly speaking, IO-Link is not a field bus, but rather a development of the known connection technology for sensors and actuators. The IO-Link output 18 is preferably of pluggable configuration. In particular, the IO-Link output 18 is configured with a protection rating of IP54 or higher. In one configuration of the switch 1, it can also have a standard Ethernet connection 17. The voltage can also be supplied to connected loads 23 via a voltage supply line 24, which is connected to a single voltage socket 19 of the switch 1, separately to the Ethernet cable 22.

In the embodiment according to FIG. 1, the housing 2 of the switch 1 is configured so as to be, in plan view, essentially rectangular with longitudinal sides and narrow sides. The communication input 3 and the system input 7 are situated on a narrow side 26 of the housing 2. The looped-through communication output 5 and the looped-through system output 9 are situated on the other, opposite narrow side 27 of the housing 2.

The voltage outputs 8 according to the disclosure, irrespective of whether they are in the form of PoE output 14, SPE output 16, IO-Link output 18 or similar output, are situated on a common longitudinal side 28 of the housing 2. In the embodiment, the opposite longitudinal side 29 of the housing 2 is free of connections. It can be expedient to also arrange data outputs, voltage outputs, or the like on the longitudinal side 29.

Figure 2:
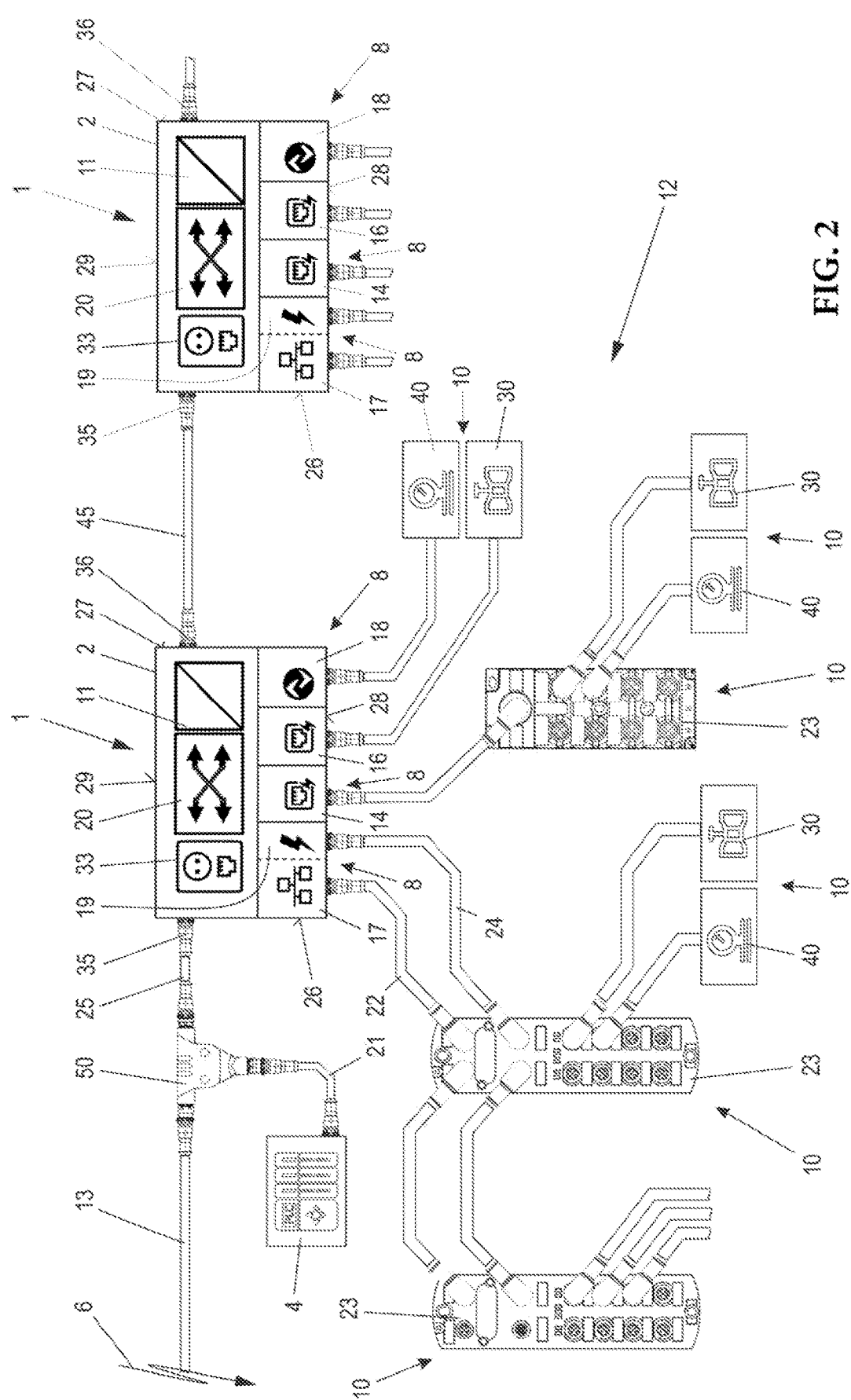

The embodiment according to FIG. 2 corresponds, in terms of basic structure, to that according to FIG. 1: identical parts are provided with identical reference signs.

In FIG. 2, the switch 1 is connected to a power line 25 that is connected to a power line input 35. The power line input 35 is preferably situated on a narrow side 26 of the housing 1. A power line output 36, which can be connected to a following switch 1 via a power line cable 45, is provided on the opposite side of the housing 1, in particular on the opposite narrow side 27 of the housing 1.

The data line (field bus 21) of the controller 4 is connected to the power cable 13 of the system voltage 6 via a coupling element 50. In the coupling element 50, the data to be transmitted are overlaid on, preferably modulated onto, the system voltage. The transmitted data and the system voltage were separated in the switch 1.

It can be advantageous to provide a plug connection 33 in the housing 2 of the switch 1, via which plug connection power supply units, for example, can be connected directly to the system voltage 6.

The power supply unit 11 installed in the switch 1 can be a transformer or a switched-mode power supply unit.

It is understood that the foregoing description is that of the preferred embodiments of the invention and that various changes and modifications may be made thereto without departing from the spirit and scope of the invention as defined in the appended claims.

The invention claimed is:

1. An ethernet switch comprising:
   a housing having at least one communication input for data of a controller, at least one system input for a system voltage, and at least one communication output;
   at least one electrical supply output configured to connect to an electrical load;
   a power supply unit disposed in said housing;
   said power supply unit having a primary side and being connected to the system voltage at said primary side, wherein the system voltage is 90 Volts to 800 Volts;

said at least one system input for the system voltage being looped through to a system output provided in said housing for the system voltage;
   said system output being configured to connect a further switch;
   said power supply unit being configured to provide a voltage supply for the ethernet switch;
   said power supply unit being configured to feed said at least one electrical supply output to an external load with an output voltage of said power supply unit; and,
   a field bus element integrated in said housing and configured to at least one of monitor and control said at least one electrical supply output to the external load.

2. The ethernet switch of claim 1, wherein the ethernet switch is a subscriber of a field bus.

3. The ethernet switch of claim 1, wherein said field bus element is adapted to start a self-configuration when the power supply unit is switched on and configure the ethernet switch.

4. The ethernet switch of claim 1, wherein said field bus element is configured to form a gateway to further protocols in a field.

5. The ethernet switch of claim 1, wherein said at least one electrical supply output is integrated at least into a PoE output.

6. The ethernet switch of claim 5, wherein said PoE output is at least one of a pluggable design and configured with a protection rating of IP54 or higher.

7. The ethernet switch of claim 1, wherein said at least one electrical supply output is integrated at least into an SPE output.

8. The ethernet switch of claim 7, wherein said SPE output is at least one of a pluggable design and configured with a protection rating of IP54 or higher.

9. The ethernet switch of claim 1, wherein said at least one electrical supply output is integrated at least into an IO-Link output.

10. The ethernet switch of claim 9, wherein said IO-Link output is at least one of a pluggable design and configured with a protection rating of IP54 or higher.

11. The ethernet switch of claim 1, wherein said communication input for data of the controller is looped through to a communication output provided in said housing.

12. The ethernet switch of claim 1, wherein said at least one system input for the system voltage and said at least one communication input are combined to form a power line.

13. The ethernet switch of claim 1, wherein the system voltage is 90 V to 800 V AC.

14. The ethernet switch of claim 1, wherein the system voltage has a nominal voltage of 110 V to 480 V AC.

15. The ethernet switch of claim 1, wherein the system voltage lies in a range of from 600 V DC to 800 V DC.

16. The ethernet switch of claim 1, wherein the ethernet switch has a protection class of IP54 and higher.

* * * * *